(12) United States Patent
Kuntz

(10) Patent No.: US 12,024,761 B2
(45) Date of Patent: Jul. 2, 2024

(54) COMPONENT FOR CONTACTING HYDROGEN

(71) Applicant: Robert Bosch GmbH, Stuttgart (DE)

(72) Inventor: Matthias Kuntz, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 132 days.

(21) Appl. No.: 16/955,764

(22) PCT Filed: Dec. 5, 2018

(86) PCT No.: PCT/EP2018/083604
§ 371 (c)(1),
(2) Date: Jun. 18, 2020

(87) PCT Pub. No.: WO2019/137698
PCT Pub. Date: Jul. 18, 2019

(65) Prior Publication Data
US 2021/0002747 A1    Jan. 7, 2021

(30) Foreign Application Priority Data

Jan. 11, 2018 (DE) .......................... 102018200343.2

(51) Int. Cl.
| | | |
|---|---|---|
| *C22C 38/02* | (2006.01) | |
| *C21D 1/20* | (2006.01) | |
| *C22C 38/22* | (2006.01) | |
| *C22C 38/24* | (2006.01) | |
| *C22C 38/38* | (2006.01) | |
| *H01M 8/04082* | (2016.01) | |

(52) U.S. Cl.
CPC ................ *C22C 38/02* (2013.01); *C21D 1/20* (2013.01); *C22C 38/22* (2013.01); *C22C 38/24* (2013.01); *C22C 38/38* (2013.01); *H01M 8/04201* (2013.01); *C21D 2211/001* (2013.01); *C21D 2211/002* (2013.01); *C21D 2211/005* (2013.01)

(58) Field of Classification Search
CPC ............................................... C21D 2211/005
See application file for complete search history.

(56) References Cited

FOREIGN PATENT DOCUMENTS

| CN | 104762559 A | 7/2015 |
|---|---|---|
| DE | 60028979 T2 | 1/2007 |
| DE | 102012219061 A1 | 4/2014 |
| EP | 1200638 A1 | 5/2002 |
| JP | 2009209423 A | 9/2009 |
| JP | 2016003351 A * | 1/2016 |
| JP | 2017057458 A | 3/2017 |
| WO | 0111096 A1 | 2/2001 |
| WO | 2017047099 A1 | 3/2017 |
| WO | 2017141907 A1 | 8/2017 |

OTHER PUBLICATIONS

English machine translation of JP 2017-057458 A of Sakiyama (Year: 2017).*
English machine translation of JP 2016-003351 A of Murakami (Year: 2016).*
International Search Report for PCT/EP2018/083604, Issued Feb. 5, 2019.
Sourmail T. et al., "Evaluation of Potential of High Si High C Steel Nanostructured Bainite for Wear and Fatigue Applications", Materials Science and Technology, Institute of Materials UK, vol. 29, No. 10, 2013. XP002788161.

* cited by examiner

*Primary Examiner* — Jophy S. Koshy
(74) *Attorney, Agent, or Firm* — NORTON ROSE FULBRIGHT US LLP; Gerard A. Messina

(57) ABSTRACT

A component for contacting hydrogen, including at least one surface, which is provided for coming into contact with a hydrogen atmosphere, at least this surface being made from steel, wherein the steel has a microstructure which includes austenite and ferrite, an austenitic structure fraction being present in a range from greater than or equal to 1 wt. % to less than or equal to 50 wt. %, and a ferritic structure fraction being present in a range from greater than or equal to 50 wt. % to less than or equal to 99 wt. %

3 Claims, No Drawings

COMPONENT FOR CONTACTING HYDROGEN

FIELD

The present invention relates to a component, which is suitable and provided for being in contact with hydrogen. In particular, the present invention relates to a component which may be part of a fuel cell system. The present invention also relates to a method for manufacturing a component of this type.

BACKGROUND INFORMATION

It is often necessary or desirable for components to be designed with a high mechanical stability. In addition to a high mechanical stability of this type, a media resistance may often be advantageous. In this regard, components are mentioned at this point, which are to have a high mechanical stability and also continuously withstand a high hydrogen pressure.

German Patent Application No. DE 10 2012 219 061 A1, for example, describes a fuel cell system, which includes a hydrogen pressure tank, from which hydrogen may be withdrawn to supply at least one anode of the fuel cell system, the hydrogen tank pressure being lowered to an input pressure with the aid of a pressure reducer and regulated to the anode pressure with the aid of a pressure control valve, the pressure reducer having a spring chamber which includes a spring-loaded valve piston, which is pressure-loaded with the aid of the pressure prevailing in the spring chamber.

German Patent Application No. DE 600 28 979 T2 further describes, without any reference to hydrogen, high-carbon steel having good properties with respect to strength, hardness and resistance to heat treatments. This document also describes a method for manufacturing steels of this type.

Similar steels are furthermore described by Sourmail et al., "Evaluation of potential of high Si high C steel nanostructured bainite for wear and fatigue applications," Materials Science and Technology, 2013, Vol. 29:1166-1173.

SUMMARY AND DETAILED DESCRIPTION OF EXAMPLE EMBODIMENTS

The present invention relates to a component for contacting hydrogen, including at least one surface, which is provided for coming into contact with a hydrogen atmosphere, at least this surface being made from steel, the steel having a microstructure which includes austenite and ferrite, an austenitic structure fraction being present in a range of greater than or equal to 1 wt. % to less than or equal to 50 wt. %, and a ferritic structure fraction being present in a range of greater than or equal to 50 wt. % to less than or equal to 99 wt. %

In accordance with an example embodiment of the present invention, a component described above advantageously permits a high mechanical stability and has a long-term stability even against high hydrogen pressures.

The present invention therefore provides a component for contacting hydrogen and thus a component which is provided and designed to come into contact with hydrogen or a hydrogen atmosphere. In general, the component is not limited with respect to its design and its specific application, but the component may generally be provided to come into contact with a hydrogen overpressure of equal to or more than 2 bar, for example equal to or more than 25 bar, approximately equal to or more than 50 bar, particularly preferably equal to or more than 100 bar or also equal to or more than 500 bar. The upper limit for the hydrogen pressure may be component-dependent and be, for example, 5 bar, 30 bar, 120 bar or also 1,000 bar.

It may furthermore be advantageous that the component is at least partially directly in contact with elementary hydrogen. Accordingly, the component has at least one surface which is provided and designed to come into contact with a hydrogen atmosphere. A hydrogen atmosphere may be understood to be, in particular, an atmosphere or a gas, in which elementary hydrogen is present in a fraction of greater than or equal to 50 wt. %, for example greater than or equal to 75 wt. %, approximately greater than or equal to 90 wt. %, for example greater than or equal to 95 wt. %. The hydrogen atmosphere may thus be, for example, pure elementary hydrogen which has a manufacturing-dependent purity.

With respect to the component, it is further provided that the latter is made from steel, at least on the surface which is provided to come into contact with a hydrogen atmosphere, as described above. A high mechanical stability may generally be facilitated by providing steel on this surface. This mechanical stability may be particularly high if, for example, the entire component is formed from steel, which permits a general stability even at high pressures.

To likewise ensure a high resistance to hydrogen, it is further provided that the steel has a microstructure which includes austenite and ferrite. With respect to the microstructure, it is provided in detail that an austenitic structure fraction is present in a range of greater than or equal to 1 wt. % to less than or equal to 50 wt. %, for example in a range of greater than or equal to 1 wt. % to less than or equal to 35 wt. %, approximately in a range of greater than or equal to 3 wt. % to less than or equal to 15 wt. %, and a ferritic structure fraction being present in a range of greater than or equal to 50 wt. % to less than or equal to 99 wt. %, for example in a range of greater than or equal to 65 wt. % to less than or equal to 99 wt. %, approximately in a range of greater than or equal to 85 wt. % to less than or equal to 97 wt. %.

The microstructure may preferably be made up of ferrite and austenite, in that a transformation to ferrite occurs, and the rest remains austenite, during a bainitization, as described below. In other words, the aforementioned areas of austenite and ferrite may add up to 100 wt. %.

It has surprisingly been proven that a steel which has, in particular, a microstructure of this type, including austenite and ferrite in the fractions described above, demonstrates a high mechanical stability and additionally has a high resistance to hydrogen. In particular, the good and pronounced resistance to the effect of hydrogen may be demonstrated in that the steel, and thus the component or at least the surface coming into contact with hydrogen, is particularly resistant to a hydrogen embrittlement.

By using a steel of this type, in particular components may thus be produced, which may be exposed to the influence of hydrogen without problems even for a long period of time and even at high pressures. As a result, a high long-term stability may be advantageously facilitated during an operation of the component. Moreover, leaks of the hydrogen may be reduced or prevented entirely, which ensures a significant safety improvement, since particularly hydrogen which escapes into the atmosphere may possibly be disadvantageous with respect to safety.

A structure described above may include, in particular, a bainitic structure. As is generally known in the field, a bainitic structure may arise from the austenite due to a heat treatment of carbon steel by isothermal transformation or continuous cooling at temperatures below the formation of pearlite up to martensite. In particular, the ferritic microstructure may be part of the bainite, since bainite may be formed from a mixture of ferrite and carbides.

In steels having C contents of greater than or equal to 0.3 wt. %, in particular greater than or equal to 0.4 wt. %, for example greater than or equal to 0.5 wt. %, and having an Si content of greater than 0.5 wt. %, in particular greater than or equal to 0.9 wt. %, for example greater than or equal to 1.5 wt. %, a bainite forms, which is not made up of ferrite and carbides (cementite) but rather of ferrite and austenite. This is due to the fact that the cementite formation is suppressed by silicon, and austenite is formed thereby.

It may furthermore be provided that the steel is carbide-free, i.e., it includes no carbide. This may further increase the aforementioned advantages.

It may therefore be particularly preferably provided that the steel includes silicon in a content of greater than or equal to 0.5 wt. % to less than or equal to 5.0 wt. %, in particular greater than or equal to 1.5 wt. % to less than or equal to 3.0 wt. %, and the steel includes carbon in a content of greater than or equal to 0.3 wt. % to less than or equal to 2.0 wt. %, in particular greater than or equal to 0.5 wt. % to less than or equal to 1.1 wt. %. In this design, in particular, it may be facilitated that the steel may ensure a high mechanical stability, including a high resistance to hydrogen, even with a long exposure and/or at high pressures, and a desired bainitization may proceed, as described above.

In particular, a material described above may have tensile strengths in a range of up to 2 GPa or even higher, and elongations at break of 20% or even more may be reached. A material, in particular in this design, may therefore have the positive properties described above.

With respect to the steel from which the entire component or at least one or all surfaces coming into contact with hydrogen may be formed, it may be particularly advantageously provided that the latter includes an alloy or is made up thereof, which includes the following constituents:

Carbon in a range from greater than or equal to 0.3 wt. % to less than or equal to 2.0 wt. %;
Silicon in a range from greater than or equal to 0.5 wt. % to less than or equal to 5.0 wt. %;
Manganese in a range from greater than or equal to 0.25 wt. % to less than or equal to 4.0 wt. %;
Chromium in a range from greater than or equal to 0.2 wt. % to less than or equal to 4.0 wt. %;
Molybdenum in a range from greater than or equal to 0 wt. % to less than or equal to 3.0 wt. %;
Vanadium in a range from greater than or equal to 0 wt. % to less than or equal to 0.8 wt. %, the remainder being formed by iron and by unavoidable impurities.

In particular, the unavoidable impurities may be due to the manufacture of the steel and/or be present in a fraction of less than or equal to 5 wt. % and/or include, for example, but not be limited to, niobium, nitrogen, oxygen, copper or phosphorus.

It may be particularly preferably provided that the steel, from which the entire component or at least one or all surfaces coming into contact with hydrogen may be formed, includes an alloy or is made up thereof, which includes the following constituents:

Carbon in a range from greater than or equal to 0.4 wt. % to less than or equal to 1.5 wt. %;
Silicon in a range from greater than or equal to 0.9 wt. % to less than or equal to 3.5 wt. %;
Manganese in a range from greater than or equal to 0.5 wt. % to less than or equal to 2.5 wt. %;
Chromium in a range from greater than or equal to 0.3 wt. % to less than or equal to 3.0 wt. %;
Molybdenum in a range from greater than or equal to 0 wt. % to less than or equal to 2.5 wt. %;
Vanadium in a range from greater than or equal to 0 wt. % to less than or equal to 0.5 wt. %, the remainder being formed by iron and by unavoidable impurities.

In particular, the unavoidable impurities may again be due to the manufacture of the steel and/or be present in a fraction of less than or equal to 5 wt. % and/or include, for example, but not be limited to, niobium, nitrogen, oxygen, copper or phosphorus.

For example, it may be provided that the steel, from which the entire component or at least one or all surfaces coming into contact with hydrogen may be formed, includes an alloy or is made up thereof, which includes the following constituents:

Carbon in a range from greater than or equal to 0.5 wt. % to less than or equal to 1.1 wt. %;
Silicon in a range from greater than or equal to 1.5 wt. % to less than or equal to 3.0 wt. %;
Manganese in a range from greater than or equal to 0.7 wt. % to less than or equal to 1.4 wt. %;
Chromium in a range from greater than or equal to 0.4 wt. % to less than or equal to 2.5 wt. %;
Molybdenum in a range from greater than or equal to 0 wt. % to less than or equal to 0.15 wt. %, the remainder being formed by iron and by unavoidable impurities.

In particular, the unavoidable impurities may again be due to the manufacture of the steel and/or be present in a fraction of less than or equal to 5 wt. % and/or include, for example, but not be limited to, niobium, vanadium, nitrogen, oxygen, copper or phosphorus.

It has surprisingly been proven that the steel, from which the entire component or at least one or all surfaces coming into contact with the hydrogen may be formed, has a high mechanical stability, combined with a good resistance to hydrogen, if it includes an alloy or is made up thereof, which includes the aforementioned constituents, in particular in the aforementioned quantities.

Moreover, an advantageous settability of the microstructure described above may be facilitated by a heat treatment, as described below, in particular in the compositions described above. In particular, a bainitization may be facilitated in time periods which may be implemented without problems.

For example, the component may be selected from a hydrogen-conducting line, a hydrogen pressure tank, a valve and an aforementioned or another component for a fuel cell system. In components of this type, in particular, a high mechanical stability, combined with a stable resistance to hydrogen over the long term, is advantageous or essential. Components of this type, in particular, should be able to ensure, for a reliable operation and a particularly good safety behavior, that they are not mechanically damaged by high hydrogen pressure and are also not subject to embrittlement due to the contacting hydrogen. The present invention may thus be advantageous, in particular for components of this type.

With respect to further advantages and technical features of the component, reference is hereby made to the description of the uses and the method, and vice versa.

The present invention also includes the use of a component, as described in detail above, for manufacturing a fuel cell system. For example, a component may be manufactured, which is selected from a hydrogen-conducting line, a hydrogen pressure tank, a valve or another component for a fuel cell system. In the case of the aforementioned component and/or a fuel cell system, in particular, it may be of enormous importance for a reliable operation and a particularly good safety behavior that they are not mechanically damaged by high hydrogen pressure and that they are no subject to embrittlement due to the contacting hydrogen.

In the case of components of this type, in particular, it may thus be advantageous that they are formed from a steel, as described above, since a steel described above has a high mechanical stability and is simultaneously not subjected to a hydrogen embrittlement, or the latter may at least be significantly reduced. As a result, a long-term mechanical stability and likewise a safe, stable operation over the long term are made possible.

With respect to further advantages and technical features of the use, reference is hereby made to the description of the component, the further use and the method, and vice versa.

The present invention also includes a method for manufacturing a component for contacting hydrogen. In accordance with an example embodiment of the present invention, the method includes the following steps:
  a) Providing a material, including a steel, which includes silicon in a content of greater than or equal to 0.5 wt. % to less than or equal to 5.0 wt. %, in particular greater than or equal to 1.5 wt. % to less than or equal to 3.0 wt. %, and which includes carbon in a content of greater than or equal to 0.3 wt. % to less than or equal to 2.0 wt. %, in particular greater than or equal to 0.5 wt. % to less than or equal to 1.1 wt. %;
  b) Possibly carrying out a homogenization of the material; and
  c) Bainitization of the possibly homogenized material, in that the material is subjected to a heat treatment in a range of greater or equal to 190° C. to less than or equal to 300° C. for a period of at least one week.

The present method may permit in a particularly positive manner that the steel contains a bainitic structure. In particular, the method described here makes it possible to produce a steel having a microstructure which includes austenite and ferrite, an austenitic structure fraction being present in a range from greater than or equal to 1 wt. % to less than or equal to 50 wt. %, and a ferritic structure fraction being present in a range from greater than or equal to 50 wt. % to less than or equal to 99 wt. %.

A steel of this type may be produced, in particular, in that the material provided in method step a) as the source product for the method described here includes silicon and carbon in the quantities described above, and furthermore, in particular, in that an bainitization of the possibly homogenized material takes place, in that the material is subjected in method step c) to a heat treatment within the temperature range described above.

With respect to method step a), the material may include, for example, steel within a selectable range, or the material may be made up of steel, or the material may be formed by steel.

With respect to the steel which is provided in method step a), it may be particularly advantageously provided that it includes an alloy or is made up thereof, which includes the following constituents:
  Carbon in a range from greater than or equal to 0.3 wt. % to less than or equal to 2.0 wt. %;
  Silicon in a range from greater than or equal to 0.5 wt. % to less than or equal to 5.0 wt. %;
  Manganese in a range from greater than or equal to 0.25 wt. % to less than or equal to 4.0 wt. %;
  Chromium in a range from greater than or equal to 0.2 wt. % to less than or equal to 4.0 wt. %;
  Molybdenum in a range from greater than or equal to 0 wt. % to less than or equal to 3.0 wt. %; and
  Vanadium in a range from greater than or equal to 0 wt. % to less than or equal to 0.8 wt. %,
the remainder being formed by iron and by unavoidable impurities.

With respect to method step b), it may be provided that a homogenization takes place if the material provided in method step a) has not yet been subjected to a homogenization. This step may be used to generate particularly uniform and thus defined properties within the material and thus also of the generated component.

It may furthermore be provided that method step b) is carried out in that the material is subjected to a heat treatment at a temperature in a range of greater than or equal to 850° C. to less than or equal to 1,000° C.

Due to a method described above, a material may be advantageously produced, which is used to manufacture components which are stable in contact with hydrogen for a long period of time and at high pressures. Due to the method described here, components may be formed, in particular using conventional steel processing processes, which combine a high mechanical stability with a good resistance to hydrogen effects.

In particular, the aforementioned advantages may take effect in a component in a fuel cell system. Examples of components include hydrogen pressure tanks, hydrogen lines and corresponding valves.

With respect to further advantages and technical features of the method, reference is hereby made to the description of the component and the uses, and vice versa.

The present invention also includes a use of a method, as described above, for manufacturing a component for a fuel cell system.

A fuel cell system is obtained hereby, which includes corresponding components which are stable even for a long period of time and at high hydrogen pressures.

With respect to further advantages and technical features of the use, reference is hereby made to the description of the method, the component and the further use, and vice versa.

What is claimed is:

1. A component, comprising:
  at least one surface, which is for coming into contact with a hydrogen atmosphere in a fuel cell system, and which is made from steel, which is a steel alloy, wherein the steel alloy has a tensile strength in a range of at least 2 GPa, and an elongation at break of at least 20%, wherein the steel alloy provides stable resistance to the hydrogen atmosphere, so that the steel alloy is not embrittled when contacting the hydrogen atmosphere and not mechanically damaged by hydrogen overpressure, and wherein the component, which is made from the steel alloy at least on the surface, is provided to come into contact with the hydrogen overpressure of equal to or more than 2 bar;

wherein the hydrogen atmosphere includes pure elementary hydrogen present in a fraction of greater than or equal to 50 wt. %, or greater than or equal to 75 wt. %, or greater than or equal to 90 wt. %, or greater than or equal to 95 wt. %, and wherein the hydrogen atmosphere includes the pure elementary hydrogen having a manufacturing-dependent purity, wherein the upper limit for a hydrogen pressure of the hydrogen atmosphere depends on the component and is up to 5 bar, up to 30 bar, up to 120 bar or up to 1,000 bar, wherein the steel alloy includes:
  a microstructure which includes austenite and ferrite, an austenitic structure fraction being present in a range of greater than or equal to 3 wt. % to less than or equal to 15 wt. %, and a ferritic structure fraction being present in a range of greater than or equal to 85 wt. % to less than or equal to 97 wt. %,
  chromium in a range from greater than or equal to 0.4 wt. % to less than or equal to 2.5 wt. %,
  silicon in a content of greater than or equal to 0.5 wt. % to less than or equal to 3.0 wt. %, and carbon in a content of greater than or equal to 0.3 wt. % to less than or equal to 1.1 wt. %,
  vanadium, which is greater than or equal to 0.5 wt. % and less than or equal to 0.8 wt. %,
  manganese in a range from greater than or equal to 0.25 wt. % to less than or equal to 1.4 wt. %,
  molybdenum in a range from greater than 0 wt. % to less than or equal to 0.15 wt. %, wherein a remainder of the steel alloy is formed by iron and by impurities, wherein the impurities are present in a fraction of greater than 0 wt. % and less than or equal to 5 wt. %, and which include niobium, nitrogen, oxygen, copper and/or phosphorus, and wherein the component is for the fuel cell system.

2. The component as recited in claim 1, wherein:
the carbon in a range from greater than or equal to 0.5 wt. % to less than or equal to 1.1 wt. %;
the silicon in a range from greater than or equal to 1.5 wt. % to less than or equal to 3.0 wt. %;
the manganese in a range from greater than or equal to 0.7 wt. % to less than or equal to 1.4 wt. %.

3. The component as recited in claim 1, wherein the component includes at least one of a hydrogen pressure tank, a hydrogen line, and/or a valve.

* * * * *